US009791540B2

(12) United States Patent
Want et al.

(10) Patent No.: US 9,791,540 B2
(45) Date of Patent: Oct. 17, 2017

(54) SELF-ORGANIZING HYBRID INDOOR LOCATION SYSTEM

(71) Applicant: Google Inc., Mountain View, CA (US)

(72) Inventors: Roy Want, Los Altos, CA (US); Ravi Jain, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 118 days.

(21) Appl. No.: 14/967,477

(22) Filed: Dec. 14, 2015

(65) Prior Publication Data

US 2017/0168135 A1    Jun. 15, 2017

(51) Int. Cl.
G01S 5/10      (2006.01)
H04W 4/04     (2009.01)
G01S 1/74      (2006.01)
G01S 1/04      (2006.01)

(52) U.S. Cl.
CPC ............... *G01S 5/10* (2013.01); *G01S 1/042* (2013.01); *G01S 1/74* (2013.01); *H04W 4/04* (2013.01)

(58) Field of Classification Search
CPC ....... H04W 4/02; H04W 64/00; H04W 4/008; H04W 8/005; H04W 36/32; H04W 4/021; H04W 4/025; H04W 4/04; H04W 64/003; G06Q 30/0639; G06Q 20/327; G06Q 30/0261; G01S 1/68; G01S 5/02; G01S 5/14; G01S 11/02; G01S 1/02; G01S 5/0036; H04M 1/72572; G01C 21/206
See application file for complete search history.

(56) References Cited

U.S. PATENT DOCUMENTS 5,940,346 A      8/1999   Sadowsky et al.
7,292,187 B2 *  11/2007   Recker ................... G01S 5/14
                                                                342/458
8,779,895 B2     7/2014   Holm
9,609,482 B1 *   3/2017   Want ...................... H04W 4/025
2005/0002481 A1  1/2005   Woo et al.
(Continued)

FOREIGN PATENT DOCUMENTS

EP           1617601         1/2006

OTHER PUBLICATIONS

PCT International Search Report for corresponding PCT Application No. PCT/US2016/057889, mailed on Jan. 26, 2017—5 pages.
Priyantha et al. "Mobile-Assisted Localization in Wireless Sensor Networks," INFOCOM 2005, 24th Annual Joint Conference of the IEEE Computer and Communications Societies. Proceedings IEEE, Miami, Florida, Mar. 13-17, 2005, vol. 1, pp. 172-183.
(Continued)

*Primary Examiner* — Nizar Sivji
(74) *Attorney, Agent, or Firm* — Dority & Manning, P.A.

(57) ABSTRACT

Systems and methods for identifying device location are provided. The method can include providing, by a mobile computing device, at least a first ultrasonic signal to a first and a second self-organizing beacon device. The method can include receiving, by the mobile computing device, a first radio frequency signal including the location of the first beacon device and a second radio frequency signal including the location of the second beacon device. The method can further include determining a first time-of-flight associated with the first beacon device and a second time-of-flight associated with the second beacon device. The method can include determining a location of the mobile computing device based at least in part on the first time-of-flight, the second time-of-flight, the location of the first beacon device, and the location of the second beacon device.

20 Claims, 6 Drawing Sheets

(56) References Cited

U.S. PATENT DOCUMENTS

| | | | |
|---|---|---|---|
| 2008/0309557 A1* | 12/2008 | Mailaender | G01S 5/0268 |
| | | | 342/463 |
| 2012/0039310 A1* | 2/2012 | Dahl | G01S 5/0289 |
| | | | 370/338 |
| 2014/0145831 A1 | 5/2014 | Bassan-Eskenazi et al. | |
| 2014/0253389 A1* | 9/2014 | Beauregard | G01S 5/02 |
| | | | 342/458 |
| 2015/0087330 A1 | 3/2015 | Prechner et al. | |

OTHER PUBLICATIONS

Nam et al. "Efficient Indoor Localization and Navigation with a Combination of Ultrasonic and CSS-based IEEE 802.15. 4a," Proceedings of the 4th International Conference on Ubiquitous Information Technologies & Applications, IEEE, Piscataway, NJ, Dec. 20-22, 2009, pp. 1-6.

Connell, "What's the Difference Between Measuring Location by UWB, WiFi, and Bluetooth?", http://electronicdesign.com/communications/what-s-difference-between-measuring-location-uwb-wi-fi-and-bluetooth, retrieved on Dec. 9, 2015, 7 pages.

Holm, "Hybrid Ultrasound-RFID Indoor Positioning: Combining the Best of Both Worlds", IEEE International Conference on RFID, Apr. 27-28, 2009, Orlando, Florida, pp. 155-162.

Liu, "Survey of Wireless Based Indoor Localization Technologies", Systems, Man and Cybernetics, vol. 37, Issue 6, Oct. 22, 2007, pp. 1067-1080.

\* cited by examiner

SELF-ORGANIZING HYBRID INDOOR LOCATION SYSTEM

FIELD

The present disclosure relates generally to determining a location of a mobile computing device and, more particularly, to systems and methods that determine the location of a mobile computing devices through the use of self-organizing beacon devices.

BACKGROUND

Knowledge of a location of a mobile computing device can be useful in the event that the device is misplaced, as well as for providing location specific services to the mobile computing device. In some location-based techniques for mobile computing devices, the mobile computing device may utilize received signal strength indications (RSSI) fingerprinting to determine a location of the mobile computing device when general Global Positioning System (GPS) satellites are obscured or unreliable. These techniques may be inaccurate and inefficient, as the positioning signals that are used by a mobile computing device are typically based on RSSI measurements originating from WiFi Access Points (APs) that are sparsely distributed.

Accuracy can be improved by creating RSSI maps measured by a mobile computing device from multiple APs at a multiplicity of locations in a building, and later make this information available to another mobile computing device through a cloud based map-service (it could be stored locally, but not typically). A mobile computing device that wishes to know its location can then record the set of RSSI values at its current location (a vector of AP RSSIs) and ask the map-service to determine the position that best fits this vector. The service then provides the mobile computing device with an approximate map position in the building matching that vector. RSSI measurements in the 2.45 GHz band, however, can be less reliable due to interference from other mobile computing devices and radios, and radio frequency (RF) noise. Measurement reliability issues can be exacerbated further by multi-path interference from signal reflections that result in constructive and destructive interference, also known as Rayleigh fading, which, in turn, leads to RSSI measurements changing significantly when a mobile computing device moves only a few centimeters. RSSI mapping techniques typically have an accuracy of 10 meters, at best. Further, creating RSSI maps is very labor intensive, and the process must be repeated whenever objects in the environment are altered or moved.

SUMMARY

Aspects and advantages of embodiments of the present disclosure will be set forth in part in the following description, or may be learned from the description, or may be learned through practice of the embodiments.

One example aspect of the present disclosure is a computer-implemented method of identifying device location. The method includes providing, by a mobile computing device, at least a first ultrasonic signal to a first beacon device and a second beacon device. The first beacon device and the second beacon device can be a portion of a plurality of beacon devices. The first beacon device can be configured to determine a first location of the first beacon device based at least in part on sending and/or receiving one or more first signals among the plurality of beacon devices. The second beacon device can be configured to determine a second location of the second beacon device based at least in part on sending and/or receiving one or more second beacon-locating signals among the plurality of beacon devices. The method can also include receiving, by the mobile computing device, a first radio frequency signal from the first beacon device. The first radio frequency signal can include information associated with the first beacon device, wherein the information associated with the first beacon device can include the first location of the first beacon device. The method can include receiving, by the mobile computing device, a second radio frequency signal from the second beacon device. The second radio frequency signal can include information associated with the second beacon device, wherein the information associated with the second beacon device comprises the second location of the second beacon device. The method includes determining, by the mobile computing device, a first time-of-flight associated with the first beacon device and a second time-of-flight associated with the second beacon device. The method also includes determining, by the mobile computing device, a third location of the mobile computing device based at least in part on the first time-of-flight, the second time-of-flight, the information associated with the first beacon device, and the information associated with the second beacon device.

Another example aspect of the present disclosure is directed to a mobile computing device. The mobile computing device can include one or more processors and one or more memory devices. The one or more memory devices can store computer-readable instructions that when executed by the one or more processors cause the one or more processors to perform operations. The operations can include providing a plurality of first signals to two or more beacon devices. The plurality of first signals can include ultrasonic signals. The two or more beacon devices can be included in a plurality of beacon devices. Each of the two or more beacon devices can be configured to communicate with the plurality of beacon devices to determine its respective location. The operations can include receiving a plurality of second signals from the two or more beacon devices. The plurality of second signals can include radio frequency signals. Each of the plurality of second signals can include data indicative of the location of one of the two or more beacon devices. The operations can include determining two or more times-of-flight respectively associated with the two or more beacon devices. The operation can further include determining a location of the mobile computing device based at least in part on the two or more times-of-flight respectively associated with the two or more beacon devices and the locations of each of the two or more beacon devices.

Yet another example aspect of the present disclosure is directed to a beacon device. The beacon device can include an ultrasonic receiver, a radio frequency transmitter, one or more processors, and one or more memory devices. The one or more memory devices can store computer-readable instructions that when executed by the one or more processors cause the beacon device to perform operations. The operations can include sending one or more first beacon-locating signals to one or more other beacon devices. The operations can further include receiving one or more second beacon-locating signals from the one or more other beacon devices. The operations can include determining a location of the beacon device based, at least in part, on one or more of the first beacon-locating signals or the second beacon-locating signals. The operations can include receiving, by the ultrasonic receiver, one or more ultrasonic signals from a mobile computing device. The operations can further include providing, by the radio frequency transmitter, one or more radio frequency signals to the mobile computing device in response to the one or more ultrasonic signals, wherein the one or more radio frequency signals comprise data indicative of the location of the beacon device.

Other example aspects of the present disclosure are directed to systems, apparatus, tangible, non-transitory computer-readable media, user interfaces, memory devices, and electronic devices for identifying a location of a mobile computing device.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
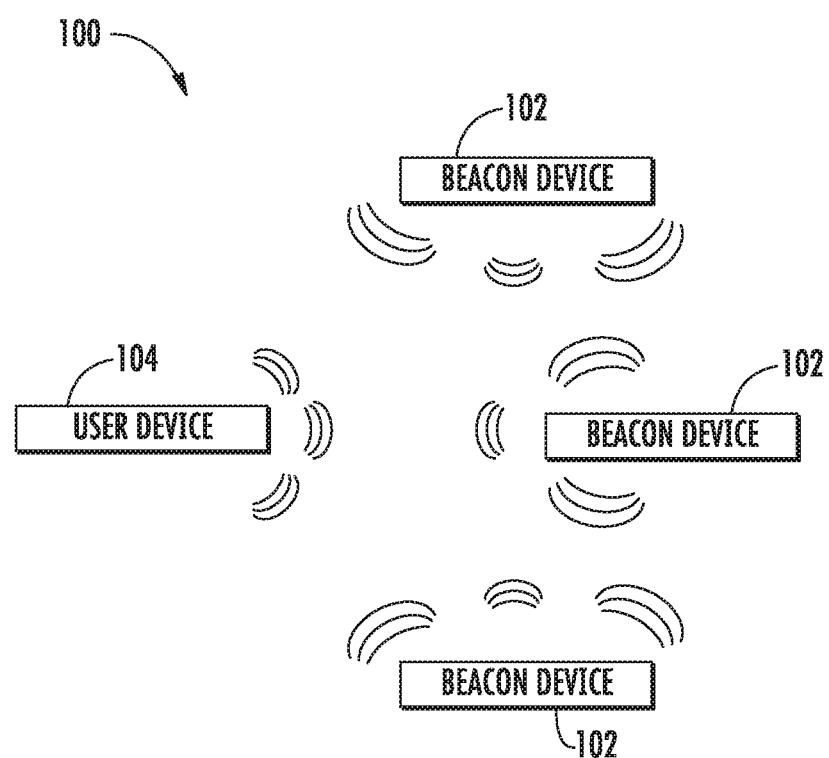
FIG. 1 depicts an example device location system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to locating a user device by communicating with a plurality of self-organizing beacon devices. For instance, it may be desirable to locate a user device within a location entity, such as a building. To initiate a user device locating process, the user device can send a first signal (e.g., ultrasonic pulses) to a plurality of beacon devices. The plurality of beacon devices can be located throughout the building. Each beacon device can be configured to self-locate by, for example, communicating among the plurality of beacon devices. The beacon devices can use one or more beacon locating signals to determine its location within the building. In response to the first signals, two or more of the beacon devices can send a plurality of second signals (e.g., RF signal, Bluetooth low energy packets) to the user device. The second signals can include the location of the beacon device, which was determined by the beacon device by sending and receiving the one or more beacon-locating signals. The user device can determine its location based, at least in part, on the locations of the two or more beacon devices that sent the second signals.

More particularly, to initiate a user device locating process, the user device can send a first signal (e.g., ultrasonic pulses) to a plurality of beacon devices. As further described herein, the user device can be, for example, a mobile computing device, smartphone, tablet, laptop computer, desktop computer, wearable computing device, or any other suitable computing device. The plurality of beacon devices can be located throughout a building. The beacon devices can be configured to self-locate by, for example, communicating among the plurality of beacon devices. For example, a beacon device can use one or more beacon-locating signals to determine its location within the building.

In response to the first signals, two or more of the beacon devices can send a plurality of second signals to the user device. The second signals can be, for example, radio frequency signals that are formatted to a certain protocol (e.g., Bluetooth low energy (BLE)). The second signals can include the location of the beacon device, which was determined by the beacon device sending and/or receiving the one or more beacon-locating signals. The user device can determine its location based, at least in part, on the locations of the two or more beacon devices that sent the second signals.

More particularly, a user device can initiate a location finding process by sending a first signal to a plurality of beacon devices. In some implementations, the first signal can include one or more ultrasonic pulses, which can be sent by an ultrasonic transmitter of the user device. Two or more beacon devices of a plurality of beacon devices can receive the first ultrasonic signal. The two or more beacon devices can be associated with a common area, such as by being located within the same room of a building.

In some implementations, the plurality of beacon devices can be self-organizing beacon devices. In particular, each of the beacon devices can be configured to self-locate by communicating with others of the plurality of beacon devices. For instance, a beacon device can send and/or receive one or more beacon-locating signals among the plurality of beacon devices. In some implementations, the beacon-locating signals can be ultra-wideband (UWB) signals. A beacon device can determine its respective location based, at least in part, on the UWB beacon-locating signals. In one example, this can be implemented based on the IEEE 802.15.4a standard under which pairwise pings between beacon devices can be timed and ranged. The times-of-flight associated with the UWB beacon-locating signals and the associated signal speeds (e.g., UWB signal speed, speed of light) can be used to determine a range within approximately 30 cm. Accordingly, the location of each beacon device can be determined for each room in a building floorplan.

For instance, one or more of the plurality of beacon devices can be an anchor beacon device. A location of the anchor beacon device can be a known reference location that can serve as a reference point for the other beacon devices. For example, the anchor beacon device can be manually installed at the known reference location and the anchor beacon device can be provided with knowledge of such location. The known reference location of the anchor beacon device can be, for example, a coordinate within a building and/or on a building map. The known reference location can be confirmed relative to an existing coordinate system such as a confirmed latitude and longitude.

In some implementations, a beacon device can send one or more initial beacon-locating signals to the anchor beacon device. The one or more initial beacon-locating signals can request information associated with the anchor beacon device. In response, the anchor beacon device can send one or more responsive beacon-locating signals to the beacon device. The responsive beacon-locating signals can include information associated with the anchor beacon device, such as the known reference location of the anchor beacon device (e.g., as a coordinate), a building map, data describing a floorplan of an interior of a building, etc. The beacon device can receive the one or more responsive beacon-locating signals and determine its location based, at least in part, on the information associated with the anchor beacon device.

In particular, as one example, a second beacon device can be positioned on a shared wall with the anchor beacon device and can leverage knowledge that it is positioned on the shared wall to determine its location based on a computed distance from the anchor beacon device and knowledge of the direction of the shared wall (e.g., as indicated by a floorplan).

As another example, in some implementations, the anchor beacon device and the second beacon device, described immediately above, can both be positioned on an exterior wall (e.g., on an interior-facing surface of an exterior wall). In such implementations, a third beacon device can determine its location based on respectively calculated ranges from the anchor beacon device and the second beacon device combined with knowledge of a floorplan of the building. For example, a potential location of the third beacon device can be ruled out if it corresponds to a location that is exterior to the building.

Furthermore, in some implementations, multiple anchor beacon devices can be used to help reduce errors in location accuracy. In particular, multiple anchor beacon devices can provide multiple confirmed location constraints for the self-organizing system. Use of multiple anchor beacon devices can also eliminate the need to place other beacon devices on a shared wall (e.g., an exterior wall) with an anchor beacon device.

Additionally, and/or alternatively, to help determine its location within a building, a beacon device can send and/or receive beacon-locating signals to and/or from other beacon devices that are not anchor beacon devices. As one example, each beacon device can perform ranging with respect to three other beacon devices (any of which may or may not be anchor devices). The beacon device can use the ranging information to perform trilateration and determine its own location relative to the other beacon devices.

Referring again to the process to determine the location of the user device, in response to receipt of a first ultrasonic signal transmitted by the user device, two or more of the beacon devices can send a plurality of second signals to the user device. In some implementations, the second signals can be radio frequency signals and can, for example, include Bluetooth low energy packets. Moreover, the second signals can include information associated with the beacon device. The information associated with the beacon device can include, for instance, the location of the beacon device (as determined via the beacon-locating signals), conditions associated with the environment around the beacon device (e.g., humidity, temperature, etc.), and/or a time delay between when the beacon device received the first ultrasonic signal and sent a second signal.

The user device can receive the second signals and can determine two or more times-of-flight respectively associated with the two or more beacon devices. For instance, the user device can determine a time-of-flight associated with the first ultrasonic signal provided to the two or more beacon devices and/or a time-of-flight associated with the second signals (e.g., radio frequency signals) received by the user device. In some implementations, the user device can determine a time-of-flight based, at least in part, on the times at which those signals were transmitted and received by either the user device and/or the beacon devices. The user device can further determine a time-of-flight based, at least in part, on the conditions associated with the environment around a beacon device and/or the time delay between when a beacon device received the first ultrasonic signal and sent a second signal.

The user device can determine its location based, at least in part, on the two or more times-of-flight respectively associated with the two or more beacon devices and the locations of the two or more beacon devices. For example, the user device can use the respective times-of-flight determined for each of the two or more beacon devices to determine the user device's respective distances from such beacon devices. If the user device receives return signals from three or more beacon devices, the user device can apply trilateration techniques to the determined distances and locations to locate itself relative to the beacon devices.

However, if the user device receives return signals from only two beacon devices, then, according to another aspect of the present disclosure, the user device can leverage knowledge or received information of a floorplan or layout of the building or other space to determine its location relative to the two beacon devices. More particularly, in some implementations, the user device can determine two or more potential locations of the user device based on the signals received from the two beacon devices. The user device can identify one of the potential locations as the actual location of the user device. For instance, the user device can identify a potential location as the actual location of the user device by determining which of the potential locations is associated with the same common area (e.g., room) as the two or more beacon devices. Thus, the mobile device can identify a potential location as the actual location of the user device based, at least in part, on data describing a floorplan of an interior of a building within which the beacon devices are located.

In such fashion, the apparatuses, systems, and methods of the present disclosure can determine the location of a user device with fine-grained accuracy. For instance, the ultrasonic ranging within a room using time-of-flight and ultrasonic signal speed (e.g., speed of sound), as described herein, can allow the mobile device to be located within an accuracy of approximately 3 cm. Moreover, the present disclosure utilizes low-cost, low-maintenance, self-organizing beacon hardware added to the infrastructure of a building to help avoid the need for expensive RSSI mapping. Furthermore, example aspects of the present disclosure can utilize currently implemented technology (e.g., BLE, speakers) without having to modify size-constrained user devices to include additional hardware (e.g., UWB radios).

With reference now to the Figures, example aspects of the present disclosure will be discussed in more detail. For instance, FIG. 1 depicts an example device location system 100 according to example embodiments of the present disclosure. In particular, system 100 can include two or more beacon devices 102 and a user device 104.

Beacon devices 102 can be hardware devices that include one or more components to send and/or receive signals (e.g., ultra-wideband, radio frequency, Bluetooth low energy packets) to and/or from other devices. Beacon devices 102 can be a portion of a plurality of beacon devices spread throughout a space, such as a retail space, an office space, a building, or any other type of enclosed facility. In some implementations, two or more beacon devices 102 can be associated with a common area, such as by being located within the same room of a building.

Each beacon device 102 can be configured to store information associated with that respective beacon device and/or another beacon device. For instance, each beacon device 102 can store beacon-specific information, such as an identification number associated with a beacon device, a name associated with a beacon device, environmental conditions (e.g., humidity, temperature, etc.) around a beacon device, and a location of a beacon device within the building.

Each beacon device 102 can be configured to determine its location by communicating among the plurality of beacon devices. For instance, each beacon device 102 can be configured to send and/or receive one or more beacon-locating signals among the plurality of beacon devices 102. In some implementations, the beacon-locating signals can be UWB signals. The beacon-locating signals can include the information associated with the beacon devices 102. Each beacon device 102 can be configured to determine its respective location based, at least in part, on the beacon-locating signals, as further described herein with respect to FIG. 2.

Beacon devices 102 can also be configured to send and/or receive signals to and/or from user device 104. For example, each beacon device 102 can be configured to send one or more radio frequency signals to user device 104. The radio frequency signals can include the information associated with beacon devices 102. For example, each beacon device 102 can be configured to send one or more Bluetooth low energy (BLE) signals to user device 104. The BLE signals can include, for example, the location of the beacon device, environmental conditions around the beacon device, etc. The beacon device 102 can send such BLE signals in response to receiving a first signal (e.g., an ultrasound signal) from the user device 104.

User device 104 can be a mobile computing device, a device associated with a user, a phone, a smart phone, a computerized watch (e.g., a smart watch), computerized eyewear, computerized headwear, other types of wearable computing devices, a tablet, a personal digital assistant (PDA), a laptop computer, a desktop computer, a gaming system, a media player, an e-book reader, a television platform, a navigation system, a digital camera, an appliance, or any other type of mobile and/or non-mobile computing device that is configured to perform the operations as described herein.

User device 104 can be configured to communicate with other devices via one or more transmitting and/or receiving components of user device 104. For instance, user device 104 can be configured to send one or more signals to beacon devices 102. The signals can be, for example, ultrasonic pulse signals. Ultrasounds are sound waves with frequencies higher than the upper audible limit of human hearing. Ultrasonic devices can operate with frequencies from 20 kHz up to several megahertz. The principle behind a pulsed-ultrasonic technology is that the transmitted signal consists of short bursts of ultrasonic energy.

User device 104 can be configured to receive one or more signals from beacon devices 102. For example, user device 104 can be configured to receive one or more radio frequency signals from beacon devices 102. The radio frequency signals can include information associated with beacon devices 102, such as, for example, the location of the beacon device, environmental conditions around the beacon device, etc.

User device 104 can be configured to determine a time-of-flight for one or more of the signals sent to and/or received from beacon devices 102. For instance, user device 104 can determine a time-of-flight associated with an ultrasonic signal provided to beacon devices 120 and/or a time-of-flight associated with a radio frequency signal received by user device 104. In some implementations, user device 104 can determine a time-of-flight based, at least in part, on the times at which those signals were transmitted and received by either user device 104 and/or beacon devices 102. Additionally, and/or alternatively, user device 104 can be configured to determine a time-of-flight based, at least in part, on the conditions associated with the environment around beacon devices 102 and/or a time delay between when beacon devices 102 received an ultrasonic signal and sent a radio frequency signal.

User device 104 can be configured to determine its location based, at least in part, on the times-of-flight and the locations of two or more beacon devices 102. For instance user device 104 can be configured to determine two or more potential locations of user device 104. User device 104 can be configured to identify one of the potential locations as the location of user device 104 based, at least in part, on data describing a floorplan of an interior of a building within which beacon devices 102 are located, as further described herein with respect to FIGS. 3-5.

Figure 2:
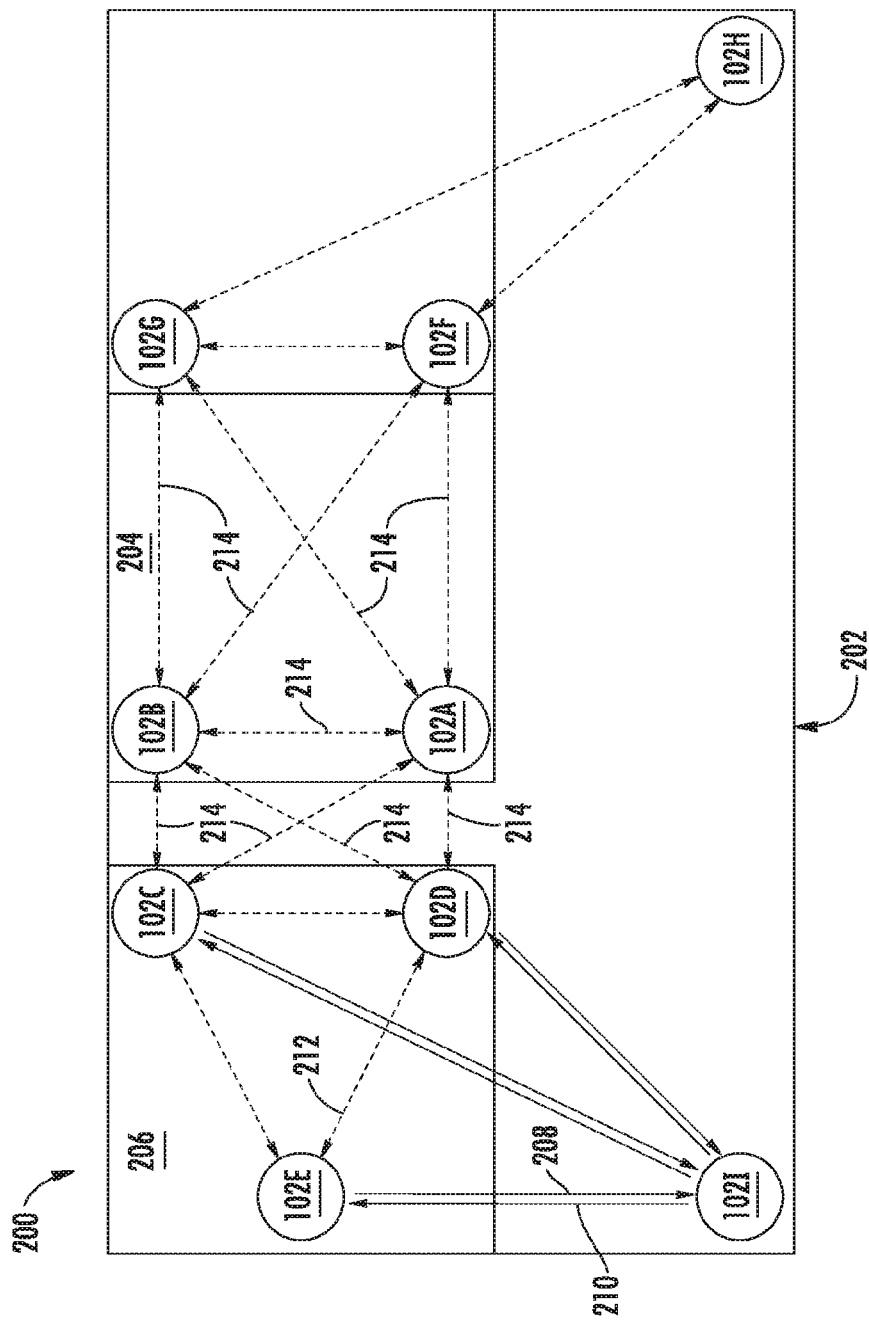
FIG. 2 depicts an example system according to example embodiments of the present disclosure.

FIG. 2 depicts an example system 200 for locating beacon devices according to example embodiments of the present disclosure. System 200 can include a plurality of beacon devices 102A-I, within a building 202. In some implementations, two or more beacon devices of the plurality of beacon devices 102A-I can be located within a common area of the building 202. For instance, as shown in FIG. 2, a first beacon device 102A and a second beacon device 102B can both be associated with area 204 of building 202. Additionally and/or alternatively, beacon devices 102C-102E can be associated with area 206. As indicated above, each of the plurality of beacon devices 102A-I can be configured to communicate among the plurality of beacon devices, for example, by sending and/or receiving beacon-locating (e.g., UWB) signals. The number(s) of beacon devices and/or rooms shown within building 202 are depicted in FIG. 2 for purposes of illustration and discussion only and are not intended to be limiting.

The plurality of beacon devices 102A-I can include one or more anchor beacon devices 102I. While only anchor beacon device 102I is illustrated in FIG. 2, any of the plurality of beacon devices 102A-I can be an anchor beacon device and any number of anchor beacon devices can be used without deviating from the scope of the present disclosure. Anchor beacon device 102I can store a reference location and an existing coordinate system. The reference location can include a location that has been confirmed relative to the existing coordinate system. For instance, the reference location of anchor beacon device 102I can be a particular coordinate (e.g., latitude and longitude) associated with anchor beacon device 102I that has been confirmed relative to an existing coordinate system, such as a building map, blueprint, architectural plan, other data describing a floorplan of an interior of building 202, etc.

In some implementations, a reference location can be identified when anchor beacon device 102I is deployed within building 202. For instance, after disposing anchor beacon device 102I within building 202, the coordinate of anchor beacon device 102I with respect to building 202 can be provided to anchor beacon device 102I. By way of example, the reference location can be programmed into a memory of anchor beacon device 102I, stored in a database associated with anchor beacon device 102I, transmitted to anchor beacon device 102I from a separate device (e.g., cloud-based server) via a network, and/or otherwise provided to anchor beacon device 102I.

Additionally and/or alternatively, the reference location of anchor beacon device 102I can be provided to anchor beacon device 102I before being deployed within building 202. For instance, in the event that the reference location of anchor beacon device 102I is known prior to anchor device 102I being deployed within building 202 (e.g., according to a known beacon device placement plan) a reference location can be provided to anchor beacon device 102I before it is deployed within building 202.

Anchor beacon device 102I can be configured to provide the reference location to one or more of the other beacon devices 102A-H. For instance, beacon device 102E can be deployed on a wall adjoining anchor beacon device 102I, which can, for example, be placed in a corner of building 202, as shown for example in FIG. 2. Beacon device 102E can be configured to send one or more initial beacon-locating signals 208 (e.g., UWB signals) to anchor beacon device 102I. One or more initial beacon-locating signals 208 can include a request for information associated with anchor beacon device 102I. In response, anchor beacon device 102I can send one or more responsive beacon-locating signals 210 (e.g., UWB signals) to beacon device 102E. One or more responsive beacon-locating signals 210 can include information associated with anchor beacon device 102I, such as the reference location of anchor beacon device 102I (e.g., as a coordinate) and/or an existing coordinate system (e.g., a building map, data describing a floorplan of an interior of a building, etc.).

Beacon device 102E can be configured to receive one or more responsive beacon-locating signals 210 and calculate a time-of-flight associated with anchor beacon device 102I. In one example, beacon device 102E can determine a time-of-flight associated with one or more initial beacon-locating signals 208. Beacon device 102E can record the time at which it sent initial beacon-locating signals 208. Anchor beacon device 102I can record the time at which it received initial beacon-locating signals 208 and include such time in responsive signals 210. In this way, beacon device 102E can determine the time-of-flight associated with one or more initial beacon-locating signals 208 by determining a difference between the time at which beacon device 102E sent initial beacon-locating signals 208 and the time at which anchor beacon device 102I received initial beacon-locating signals 208.

In another example, beacon device 102E can determine a time-of-flight associated with one or more responsive beacon-locating signals 210. For instance, anchor beacon device 102I can include the time in which it sent responsive beacon-locating signals 210 to beacon device 102E and beacon device 102E can record the time at which it received responsive signals 210. In this way, beacon device 102E can determine the time-of-flight associated with one or more responsive beacon-locating signals 210 by determining a difference between the time at which anchor beacon device 102I sent responsive beacon-locating signals 210 and the time at which beacon device 102E received responsive beacon-locating signals 210.

In yet another example, beacon device 102E can determine a time-of-flight associated with initial beacon-locating signals 208 and/or responsive beacon-locating signals 210 based, at least in part, on a time delay. For instance, beacon device 102E can record the time at which it sent initial beacon-locating signals 208. Anchor beacon device 102I can include, in responsive beacon-locating signals 210, a time delay indicating a time difference between when anchor beacon device 102I received initial beacon-locating signals 208 and sent responsive beacon-locating signals 210. Beacon device 102E can record the time at which it receives responsive signals 210. In this way, beacon device 102E can determine the time-of-flight associated with one or more initial beacon-locating signals 208 and/or one or more responsive beacon-locating signals 210 based, at least in part, on the time at which beacon device 102E sent initial beacon-locating signals 208, the time at which beacon device 102E received responsive beacon-locating signals 210, and the time delay.

Beacon device 102E can be configured to determine its location. For instance, beacon device 102E can be configured to determine its location based, at least in part, on the time-of-flight associated with anchor beacon device 102I, the reference location of anchor beacon device 102I, and the fact that beacon device 102E is deployed on a wall adjoining anchor beacon device 102I.

Beacon devices 102A-H can be configured to send one or more beacon-locating signals among beacon devices 102A-H. Each of beacon devices 102A-H can be configured to include information associated with the specific beacon device 102A-H in the one or more beacon-locating signals. Such information can include, for example, an identification number associated with the beacon device, a name, environmental conditions around the beacon device (e.g., humidity, temperature, etc.), and/or a location within the building.

For instance, beacon device 102E can be configured to send one or more beacon-locating signals 212 to beacon device 102D. Beacon-locating signals 212 can include information associated with beacon device 102E and/or any other beacon device 120A-E. For instance, beacon-locating signals 212 can include a location of beacon device 102E and/or a location of anchor beacon device 102I. Beacon device 102D can be configured to determine its location based, at least in part, on beacon-locating signals 212 and/or other beacon-locating signals sent to and/or from beacon device 102D.

In a similar manner, each beacon device 102A-H can be configured to determine its respective location based on sending and/or receiving one or more beacon-locating signals among the plurality of beacon devices 102A-I. For instance, first beacon device 102A and second beacon device 102B can each be configured to determine its respective location by sending and/or receiving one or more beacon-locating signals 214 (e.g., that include information associated with one or more beacon device) among the plurality of beacon devices 102A-I.

Figure 3:
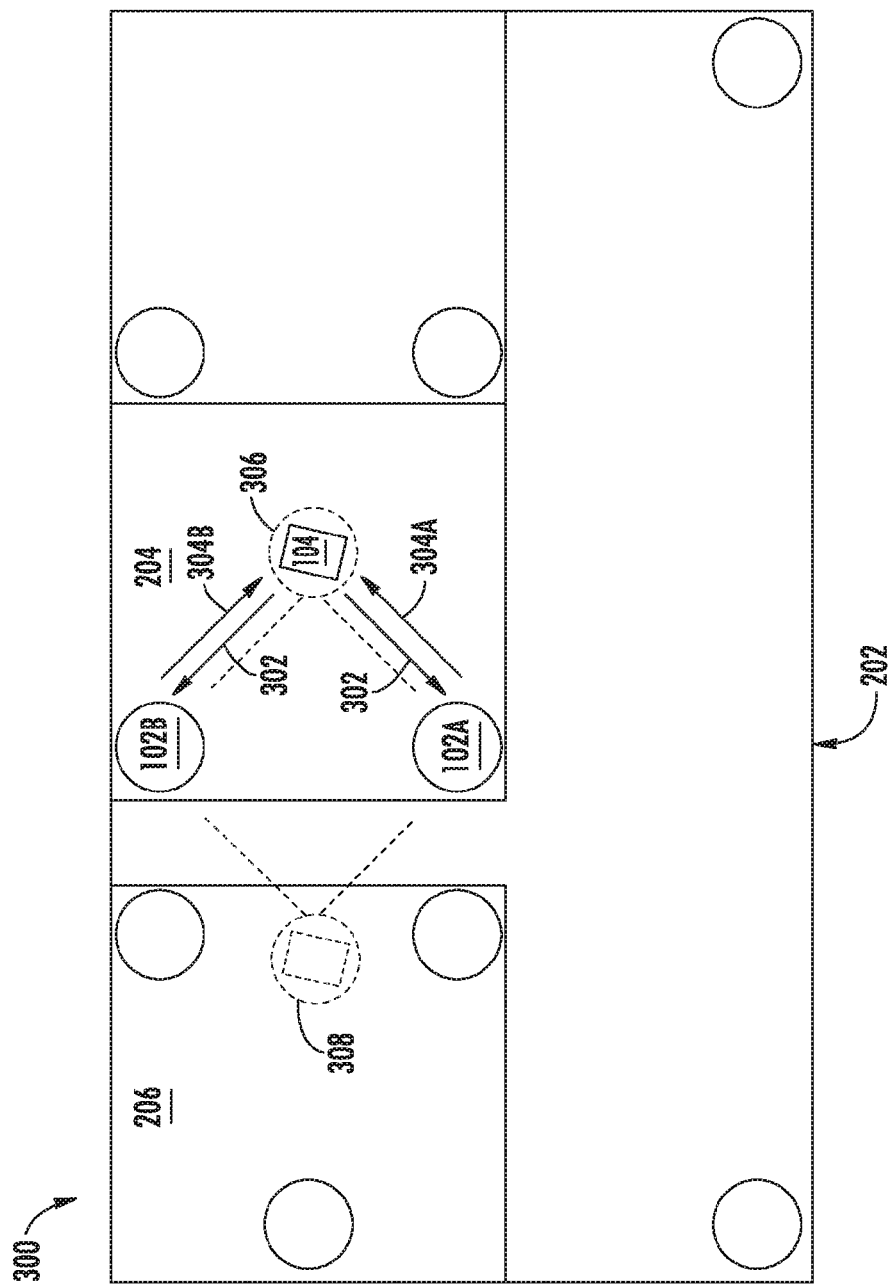
FIG. 3 depicts an example system according to example embodiments of the present disclosure.

FIG. 3 depicts an example system 300 for locating a user device according to example embodiments of the present disclosure. The system 300 can include at least two or more beacon devices 102A and 102B of a plurality of beacon devices, as well as user device 104. The at least two beacon devices 102A and 102B can be located within the same area 204. To initiate a location finding process, user device 104 can be configured to send a first signal 302 to two or more beacon devices 102A, 102B. First signal 302 can, for instance, include ultrasonic pulses, which can be sent by an ultrasonic transmitter of user device 104. Beacon devices 102A, 102B can be configured to receive the first ultrasonic signal. As indicated above with respect to FIG. 2, each beacon device 102A, 102B can be configured to communicate with the plurality of beacon devices 102A-I to determine its respective location within building 202, for example, by sending and/or receiving a plurality of beacon-locating signals.

Beacon devices 102A, 102B can be configured to send, to user device 104, a plurality of second signals 304A, 304B in response to first signal 302. In some implementations, second signals 304A, 304B can be radio frequency signals and can, for example, include Bluetooth low energy packets. Second signals 304A, 304B can include information associated with respective beacon devices 102A, 102B. For instance, second signals 304A, 308B can include data indicative of the location of beacon devices 102A, 102B (as determined via the beacon-locating signals), conditions associated with the environment around beacon devices 102A, 102B (e.g., humidity, temperature, etc.), a receipt time indicating a time at which beacon devices 102A, 102B received first signal 302, a transmission time indicating a time at which beacon devices 102A, 102B sent second signals 304A, 304B, and/or a time delay between when beacon devices 102A, 102B received first signal 302 and sent second signals 304A, 304B.

User device 104 can be configured to receive second signals 304A, 304B and to determine two or more times-of-flight respectively associated with the two or more beacon devices 102A, 102B. For instance, user device 104 can be configured to determine a time-of-flight associated with first signal 302 provided to beacon devices 102A, 102B. Additionally and/or alternatively, user device 104 can be configured to determine a time-of-flight associated with second signals 304A, 304B received by user device 104. In some implementations, user device 104 can be configured to determine a time-of-flight based, at least in part, on the times at which the first and/or second signals 302, 304A, 304B were transmitted and/or received by either user device 104 and/or beacon devices 102A, 102B. User device 104 can further be configured to determine a time-of-flight based, at least in part, on the conditions associated with the environment around beacon devices 102A, 102B and/or the time delay between when beacon devices 102A, 102B received first signal 302 and sent second signals 304A, 304B, as further described herein.

User device 104 can be configured to determine its location based, at least in part, on the times-of-flight associated with each of beacon devices 102A, 102B and the locations of beacon devices 102A, 102B. For example, user device 104 can be configured to use the respective times-of-flight determined for each of beacon devices 102A, 102B to determine the distance from beacon device 102A to user device 104 and the distance from beacon device 102B to user device 104. In some implementations, if user device 104 receives radio frequency signals from three or more beacon devices, user device 104 can apply trilateration techniques to the determined distances and locations to locate itself relative to the beacon devices.

However, in some implementations, only two beacon devices may be present within each common area (e.g., common area 204). In such implementations, user device 104 can be configured to determine at least two potential locations associated with user device 104. For instance, user device 104 can be configured to determine a first potential location 306 and a second potential location 308 based, at least in part, on the times-of-flight associated with each of beacon devices 102A, 102B and the locations of each of beacon devices 304A, 304B.

User device 104 can be configured to identify one of the potential locations as the actual location of user device 104. For instance, second signals 304A, 304B can include data indicative of a floorplan or layout of building 202 or other space. User device 104 can be configured to leverage the received data of the floorplan or layout of building 202 or other space to determine its location relative to beacon devices 102A, 102B. For instance, user device 104 can be configured to identify the first potential location 306 or the second potential location 308 as the actual location of user device 104 by determining which of the potential locations 306, 308 is associated with the same common area 204 (e.g., room) as beacon devices 102A, 102B. In FIG. 3, for example, first potential location 306 is associated with the same common area 204 as beacon devices 102A, 102B, and thus, first potential location 306 can be identified as the location of user device 104.

Figure 4:
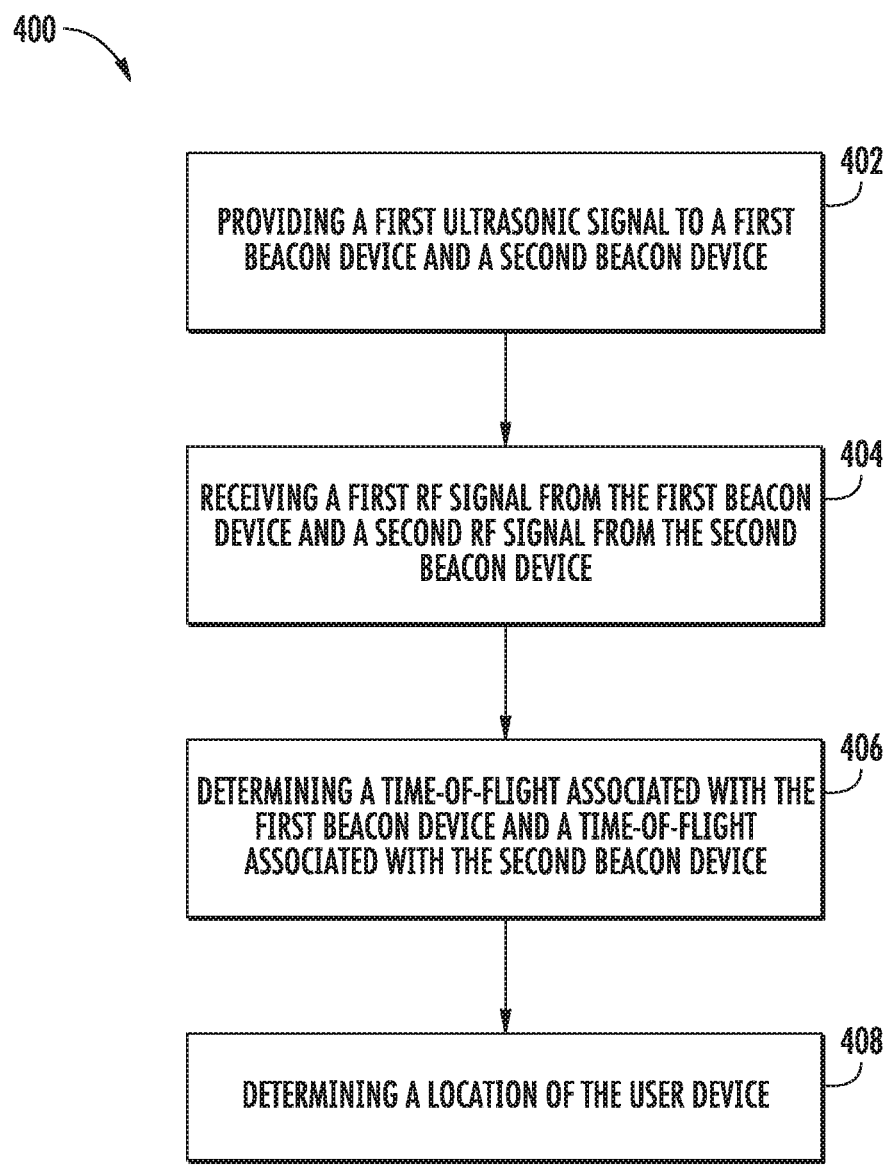
FIG. 4 depicts a flow diagram of an example method of identifying device location according to example embodiments of the present disclosure.

FIG. 4 depicts a flow diagram of an example method (400) of identifying device location according to example embodiments of the present disclosure. Method (400) can be implemented by one or more computing devices, such as user device 104. In addition, FIG. 4 depicts steps performed in a particular order for purposes of illustration and discussion. The steps of any of the methods discussed herein can be adapted, rearranged, expanded, omitted, or modified in various ways without deviating from the scope of the present disclosure.

At (402), method (400) can include providing a first ultrasonic signal to a first beacon device and a second beacon device. For instance, user device 104 can provide at least a first ultrasonic signal to a first beacon device 102A and a second beacon device 102B. First beacon device 102A and second beacon device 102B can be a portion of a plurality of beacon devices 102A-I. First beacon device 102A can be configured to determine a first location of first beacon device 102A based, at least in part, on sending and/or receiving one or more first beacon-locating signals among the plurality of beacon devices 102A-I. Second beacon device 102B can be configured to determine a second location of second beacon device 102B based, at least in part, on sending and/or receiving one or more second beacon-locating signals among the plurality of beacon devices 102A-I. First beacon device 102A and second beacon device 102B can receive the first ultrasonic signal.

In response to receiving the first ultrasonic signal, first beacon device 102A can send a first radio frequency signal to user device 104 and second beacon device 102B can send a second radio frequency signal to user device 104. Each of the first radio frequency signal and the second radio frequency signal can respectively include Bluetooth low energy packets. The first radio frequency signal can include information associated with first beacon device 102A. For instance, the information associated with first beacon device 102A can include the first location of first beacon device 102A and/or a condition of the environment (e.g., humidity, temperature) around first beacon device 102A. The second radio frequency signal can include information associated with second beacon device 102B. For instance, the information associated with second beacon device 102B can include the second location of second beacon device 102B and/or a condition of the environment around second beacon device 102B.

At (404), method (400) can include receiving a first radio frequency signal from the first beacon device and a second radio frequency signal from the second beacon device. For instance, user device 104 can receive the first radio frequency signal from first beacon device 102A, including the information associated with first beacon device 102A. User device 104 can receive the second radio frequency signal from second beacon device 102B, including the information associated with second beacon device 102B.

At (406), the method (400) can include determining a time-of-flight associated with the first beacon device and a time-of-flight associated with the second beacon device. For instance, user device 104 can determine a first time-of-flight associated with first beacon device 102A and a second time-of-flight associated with second beacon device 102B.

In one example, the information associated with first beacon device 102A (and included in the first radio frequency signal) can include a first transmission time of the first radio frequency signal, indicating the time at which the first radio frequency signal was sent from first beacon device 102A. The information associated with second beacon device 102B (and included in the second radio frequency signal) can include a second transmission time of the second radio frequency signal, indicating the time at which the second radio frequency signal was sent from second beacon device 102B. User device 104 can determine a first receipt time for the first radio frequency signal and a second receipt time for the second radio frequency signal. The first receipt time can indicate a first time at which the first radio frequency signal is received by user device 104. The second receipt time can indicate a second time at which the second radio frequency signal is received by user device 104.

User device 104 can determine the first time-of-flight associated with first beacon device 102A based, at least in part, on the first transmission time of the first radio frequency signal and the first receipt time of the first radio frequency signal. For instance, user device 104 can determine a difference between the first transmission time and the first receipt time. User device 104 can also determine the second time-of-flight associated with second beacon device 102B based, at least in part, on the second transmission time of the second radio frequency signal and the second receipt time of the second radio frequency signal. For instance, user device 104 can determine a difference between the second transmission time and the second receipt time.

In another example, the information associated with first beacon device 102A (and included in the first radio frequency signal) can include a first receipt time that indicates when first beacon device 102A received the first ultrasonic signal. The information associated with second beacon device 102B (and included in the second radio frequency signal) can include a second receipt time that indicates when second beacon device 102B received the first ultrasonic signal. User device 104 can determine a transmission time of the first ultrasonic signal that indicates when user device 104 provided the first ultrasonic signal.

User device 104 can determine the first time-of-flight associated with first beacon device 102A based, at least in part, on the transmission time of the first ultrasonic signal and the first receipt time. For instance, user device 104 can determine a difference between the transmission time of the first ultrasonic signal and the first receipt time.

Moreover, user device 104 can determine the second time-of-flight associated with second beacon device 102B based, at least in part, on the transmission time of the first ultrasonic signal and the second receipt time. For instance, user device 104 can determine a difference between the transmission time of the first ultrasonic signal and the second receipt time.

In yet another example, the information associated with first beacon device 102A (and included in the first radio frequency signal) can include a first time delay that indicates a time difference between when first beacon device 102A received the first ultrasonic signal and transmitted the first radio frequency signal. The information associated with second beacon device 102B (and included in the second radio frequency signal) can include a second time delay that indicates a time difference between when second beacon device 102B received the first ultrasonic signal and transmitted the second radio frequency signal. User device 104 can determine a transmission time of the first ultrasonic signal that indicates when user device 104 provided the first ultrasonic signal. User device 104 can also determine a first receipt time for the first radio frequency signal that indicates a first time at which the first radio frequency signal is received by user device 104. User device 104 can determine a second receipt time for the second radio frequency signal that indicates a second time at which the second radio frequency signal is received by user device 104.

User device 104 can determine the first time-of-flight associated with first beacon device 102A based, at least in part, on the transmission time of the first ultrasonic signal, the first time delay, and the first receipt time. For instance, using the first time delay, user device 104 can determine a difference between the transmission time of the first ultrasonic signal and when the first ultrasonic signal was received by first beacon device 102A. Additionally and/or alternatively, using the first time delay, user device 104 can determine a difference between the time at which first beacon device 102A transmitted the first radio frequency signal and the first receipt time.

User device 104 can also determine the second time-of-flight associated with second beacon device 102B based, at least in part, on the transmission time of the first ultrasonic signal, the second time delay, and the second receipt time. For instance, using the second time delay, user device 104 can determine a difference between the transmission time of the first ultrasonic signal and when the first ultrasonic signal was received by second beacon device 102B. Additionally and/or alternatively, using the second time delay, user device 104 can determine a difference between the time at which second beacon device 102B transmitted the second radio frequency signal and the second receipt time.

At (408), method (400) can include determining a location of the user device. For instance, user device 104 can determine a third location of user device 104 based, at least in part, on the first time-of-flight associated with first beacon device 102A, the second time-of-flight associated with second beacon device 102B, the information associated with first beacon device 102A included in the first radio frequency signal (e.g., the location of first beacon device 102A), and the information associated with second beacon device 102B included in the second radio frequency signal (e.g., the location of second beacon device 102B).

Figure 5:
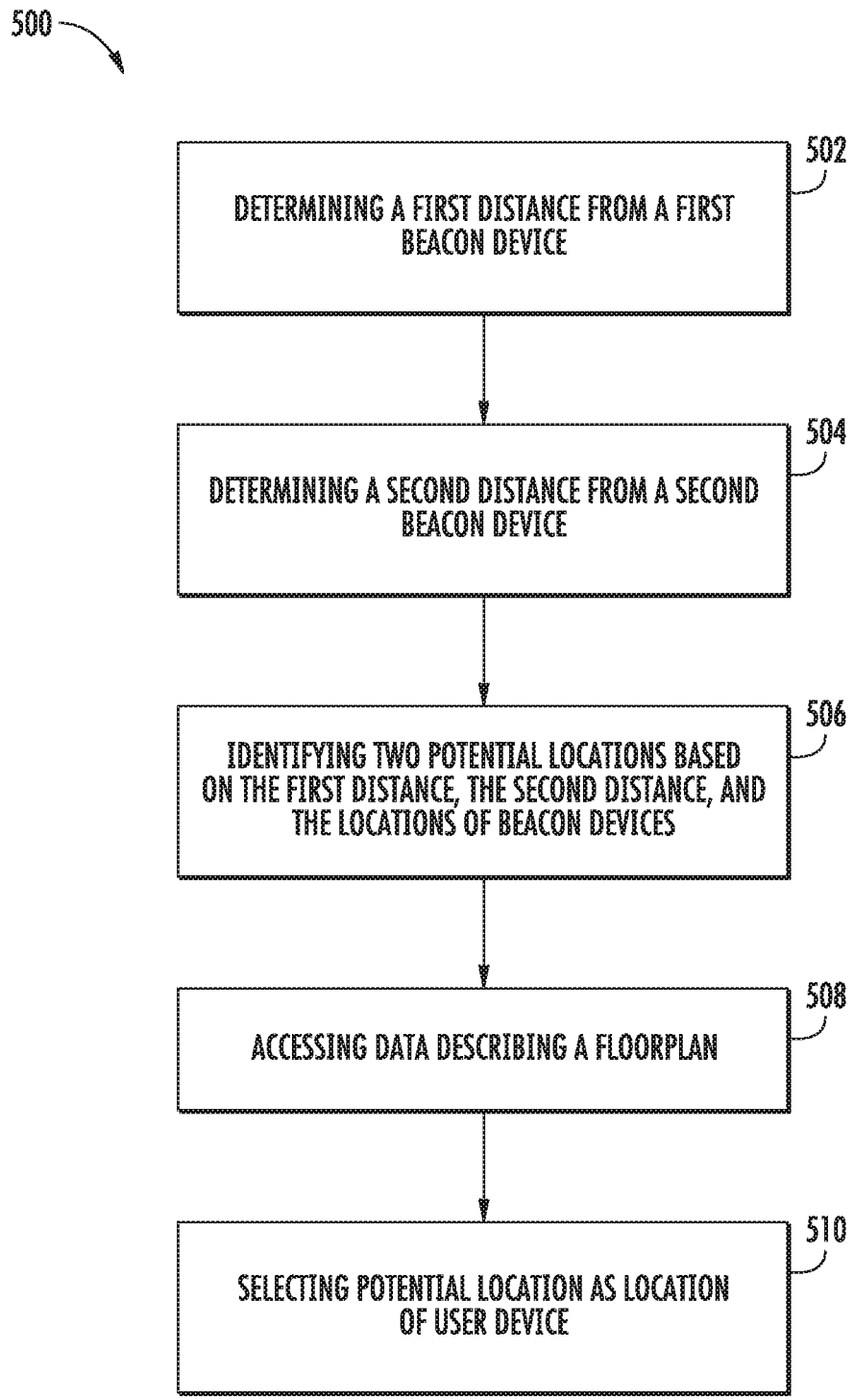
FIG. 5 depicts a flow diagram of an example method of determining device location according to example embodiments of the present disclosure.

FIG. 5 depicts a flow diagram of an example method (500) of determining device location according to example embodiments of the present disclosure. Method (500) can be implemented by one or more computing devices, such as user device 104. In addition, FIG. 5 depicts steps performed in a particular order for purposes of illustration and discussion. The steps of any of the methods discussed herein can be adapted, rearranged, expanded, omitted, or modified in various ways without deviating from the scope of the present disclosure.

At (502), method (500) can include determining a first distance from a first beacon device. For instance, user device 104 can determine a first distance from first beacon device 102A based, at least in part, on the first time-of-flight associated with first beacon device 102A. For example, user device 104 can multiply the first time-of-flight by a signal speed of the associated signal to determine a first distance (e.g., radius) from first beacon 102A. In the event that the first time-of-flight is associated with the first ultrasonic signal, user device 104 can multiply the first time-of-flight by a signal speed associated with the first ultrasonic signal. In the event that the first time-of-flight is associated with the first radio frequency signal, user device 104 can multiply the first time-of-flight by a signal speed associated with the first radio frequency signal. In some examples, the signal speed can be a constant signal speed. In other examples, the signal speed can be determined based on one or more conditions of the environment around first beacon device 102A. As indicated above, such environmental conditions can be included in the first radio frequency signal sent by first beacon device 102A and received by user device 104.

At (504), method (500) can include determining a second distance from a second beacon device. For instance, user device 104 can determine a second distance from second beacon device 102B based, at least in part, on the second time-of-flight associated with second beacon device 102B. For example, user device 104 can multiply the second time-of-flight by a signal speed of the associated signal to determine a second distance (e.g., radius) from second beacon 102B. In the event that the second time-of-flight is associated with the first ultrasonic signal, user device 104 can multiply the second time-of-flight by a signal speed associated with the first ultrasonic signal. In the event that the second time-of-flight is associated with the second radio frequency signal, user device 104 can multiply the second time-of-flight by a signal speed associated with the second radio frequency signal. In some examples, the signal speed can be a constant signal speed. In other examples, the signal speed can be determined based on one or more conditions of the environment around second beacon device 102B (e.g., temperature, humidity). Such environmental conditions can be included in the second radio frequency signal sent by second beacon device 102B and received by user device 104.

At (506), method (500) can include identifying two potential locations based on the first distance, the second distance, and the locations of the first and second beacon devices. For instance, user device 104 can determine a first potential location 306 and a second potential location 308 of user device 104 based, at least in part, on the first distance from first beacon device 102A, the second distance from second beacon device 102B, and the locations of first and second beacon devices 102A, 102B. For example, using the first distance and the location of first beacon device 102A, user device 104 can determine a first circumferential circle (e.g., with a radius equal to the first distance) around first beacon device 102A. Using the second distance and the location of second beacon device 102B, user device 104 can determine a second circumferential circle (e.g., with a radius equal to the second distance) around second beacon device 102B. First and second potential locations 306, 308 can, for example, each correspond to a respective point at which the first circumferential circle around first beacon device 102A intersects the second circumferential circle around second beacon device 102B.

At (508), method (500) can include accessing data describing a floorplan of a building. For instance, the information associated with first beacon device 102A and/or second beacon device 102B (included in the first and/or second radio frequency signals) can include data describing a floorplan of an interior of building 202 within which first and second beacon devices 102A, 102B are located. User device 104 can receive and access the data describing the floorplan of the interior of building 202. The user device can also access the data describing the floorplan from a remote database over a network (e.g., by communicating with a server computing device over the Internet).

At (510), method (500) can include selecting one of the potential locations as the location of the user device. For instance, user device 104 can identify first potential location 306 or second potential location 308 as the actual or approximate location of user device 104. User device 104 can identify first potential location 306 or second potential locations 308 as the location of user device 104 based on the data describing the floorplan of the interior of building 202 within which first and second beacon devices 102A, 102B are located. For example, first beacon device 102A and second beacon device 102B can be located within a common first area 204. User device 104 can identify either first potential location 306 or second potential location 308 as the location of user device 104 by determining which of first potential location 306 or second potential location 308 is associated with the common first area 204. For example, as shown in FIG. 3, first potential location 306 is associated with first area 204, the same area as first and second beacon devices 102A, 102B. Thus, user device 104 can identify first potential location 306 as the location of user device 104. Additionally and/or alternatively, user device 104 can identify either first potential location 306 or second potential location 308 as the location of user device 104 by determining which of first potential location 306 or second potential location 308 is not associated with the common first area 204. For example, as shown in FIG. 3, second potential location 308 is associated with second area 206, not first area 204. As such, user device 104 can identify first potential location 306 as the location of user device 104.

Figure 6:
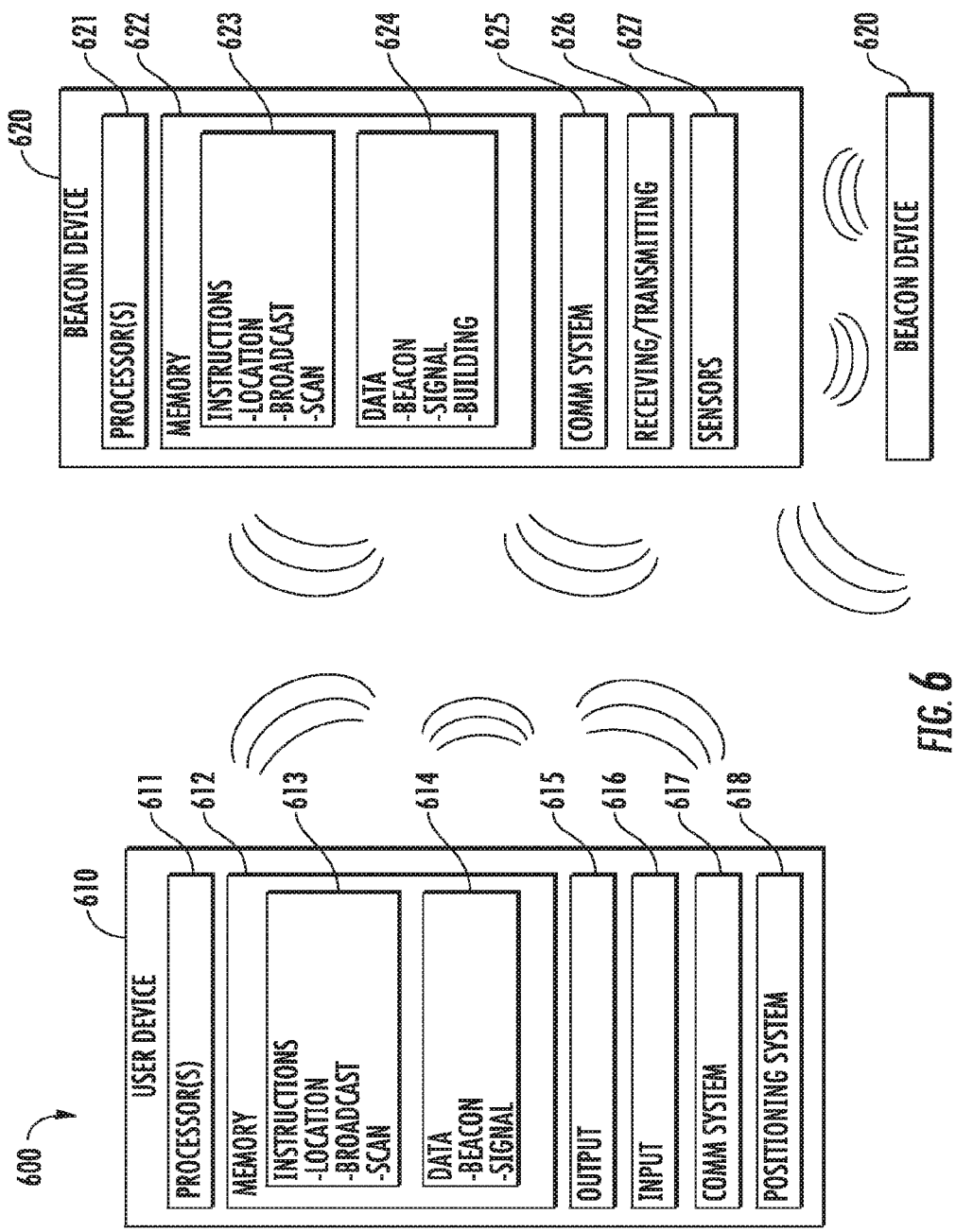
FIG. 6 depicts an example system according to example embodiments of the present disclosure.

FIG. 6 depicts an example system 600 that can be used to implement the methods and systems of identifying device location according to example aspects of the present disclosure. System 600 can include one or more user devices 610 and one or more beacon devices 620. User device 610 can, for instance, correspond to user device 104 as described herein. Beacon device(s) 620 can, for instance, correspond to beacon devices 102 as described herein.

User device 610 can be any suitable type of a mobile computing device, a device associated with a user, a phone, a smart phone, a computerized watch (e.g., a smart watch), computerized eyewear, computerized headwear, other types of wearable computing devices, a tablet, a personal digital assistant (PDA), a laptop computer, a desktop computer, a gaming system, a media player, an e-book reader, a television platform, a navigation system, a digital camera, an appliance, an embedded computing device, or any other type of mobile and/or non-mobile computing device that is configured to perform the operations as described herein. User device 610 can include one or more processor(s) 611 and one or more memory devices 612.

The one or more processor(s) 611 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 612 can include one or more computer-readable media, including, but not limited to, non-transitory computer-readable media, RAM, ROM, hard drives, flash memory, or other memory devices.

The one or more memory devices 612 can store information accessible by the one or more processors 611, including instructions 613 that can be executed by the one or more processors 611. For instance, the memory devices 612 can store instructions 613 for implementing a location determining process, a broadcast process (e.g., to send ultrasonic signals), a scan process (e.g., to scan for and detect signals from beacon device(s) 620), any capabilities of user device 140 as described herein, and/or various aspects of any of the systems and/or methods disclosed herein.

The one or more memory devices 612 can also include data 614 that can be retrieved, manipulated, created, or stored by the one or more processors 611. The data can include, for instance, information associated with beacon device(s) 620 and/or information associated with one or more signals sent and/or received by user device 610 (e.g., transmission times, receipt times, signal speeds).

User device 610 can include various input/output components for providing and receiving information. Output component 615, in some examples, can be configured to provide output to a user using tactile, audio, or video stimuli. Output component 615, in one example, can include an electronic display, a loudspeaker, or any other type of device for converting a signal into an appropriate form understandable to humans or machines. The electronic display can be an LCD or OLED part of a touch screen, can be a non-touchscreen direct view display component such as a CRT, LED, LCD, or OLED. The display component can also be a projector instead of a direct view display. Output component 615 can also include a structure capable of outputting a radio signal (e.g., radio output component) and/or a structure capable of outputting an ultrasonic pulse (e.g., ultrasonic output component). For instance, the radio output component can comprise an RF modulator, an RF transmitter, a radio antenna (either external or internal), a signal generator, or a radio amplifier, among other things. Further, the ultrasonic output component can include an ultrasonic transponder, an ultrasonic transducer, an ultrasonic sensor, or an ultrasonic transmitter, among other things. In some implementations, the ultrasonic output component can be a speaker, such as is found in commonly available smartphones and/or other personal mobile computing devices.

Input components 616, in some examples, can be configured to receive input from a user through tactile, audio, or video feedback. Examples of input components 616 can include a display component, a mouse, a keyboard, a camera, a microphone or any other type of device for detecting input from a user. In some examples, a display component includes a touch-sensitive screen. Input component 616 can also include a structure capable of receiving a radio frequency signal (e.g., Bluetooth low energy packets). For instance, input component 616 can include a radio antenna, a radio receiver, a communication receiver, or a scanner, among other things.

User device 610 can further include a communication system 617. Communication system 617 can be used to communicate with another device, such as beacon device(s) 620, via one or more wired and/or wireless networks by transmitting and/or receiving network signals on the one or more networks. Communication system 617 can include a network interface, network interface card, such as an Ethernet card, an optical transceiver, a radio frequency transceiver, or any other type of device that can send and/or receive information. Examples of such network interfaces can include Bluetooth, infrared signaling, 3G, LTE, and Wi-Fi radios as well as Universal Serial Bus (USB) and Ethernet. A network interface can include any suitable components for interfacing with one more networks, including for example, transmitters, receivers, ports, controllers, antennas, or other suitable components. In some examples, user device 610 can utilize communication system 617 to wirelessly communicate with another computing device that is operably coupled to user device 610.

User device 610 can further include a positioning system 618. The positioning system 618 can be any device or circuitry for determining the position of user device 610. For example, the positioning system 618 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using trilateration and/or proximity to cellular towers or WiFi hotspots, WiFi time-of-flight, and/or other suitable techniques for determining position.

Beacon device(s) 620 can include one or more processor(s) 621 and one or more memory devices 622. The one or more processor(s) 621 can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 622 can include one or more computer-readable media, including, but not limited to, non-transitory computer-readable media, RAM, ROM, hard drives, flash memory, or other memory devices.

The one or more memory devices 622 can store information accessible by the one or more processors 621, including instructions 623 that can be executed by the one or more processors 621. For instance, the memory devices 622 can store instructions 623 for implementing a beacon location determining process, a broadcast process (e.g., to send beacon-locating signals, UWB signals, radio frequency signals), a scan process (e.g., to scan for and detect signals from user device 610 and/or other beacon devices), any capabilities of beacon devices 102 as described herein, and/or various aspects of any of the systems and/or methods disclosed herein.

The one or more memory devices 622 can also include data 624 that can be retrieved, manipulated, created, or stored by the one or more processors 621. The data can include, for instance, information associated with beacon device(s) 620 (e.g., location, environmental conditions around the beacon device), information associated with one or more signals sent and/or received by beacon device 620 (e.g., transmission times, receipt times, time delays, signal speeds), and/or information associated with a building with which beacon device 620 is associated (e.g., data describing a floorplan of a building).

Beacon device(s) 620 can further include a communication system 625. Communication system 625 can be used to communicate with another device, such as another beacon device 620 and/or user device 610, via one or more wired and/or wireless networks by transmitting and/or receiving network signals on the one or more networks. Communication system 625 can include a network interface, network interface card, such as an Ethernet card, an optical transceiver, a radio frequency transceiver, or any other type of device that can send and/or receive information. Examples of such network interfaces can include Bluetooth, infrared signaling, 3G, LTE, and Wi-Fi radios as well as Universal Serial Bus (USB) and Ethernet. A network interface can include any suitable components for interfacing with one more networks, including for example, transmitters, receivers, ports, controllers, antennas, or other suitable components. In some examples, beacon device(s) 620 can utilize communication system 625 to wirelessly communicate with another computing device that is operably coupled to beacon device(s) 620.

Beacon device(s) 620 can include a receiving/transmitting unit 626. For example, receiving/transmitting unit 626 can include any component capable of inputting and/or outputting a beacon-locating signal (e.g., UWB signal), a radio frequency signal, and/or an ultrasonic pulse signal. For instance, receiving/transmitting unit 626 can include an RF modulator, an RF transmitter, a radio antenna (either external or internal), a signal generator, a radio amplifier, a radio receiver, a communication receiver, or a scanner, among other things. Further, receiving/transmitting unit 626 can include an ultrasonic transponder, an ultrasonic transducer, an ultrasonic sensor, or an ultrasonic transmitter, among other things.

Beacon device(s) 620 can further include one or more sensor(s) 627. The one or more sensor(s) 627 can, for instance, be configured to measure the conditions of the environment around beacon device(s) 620. Sensor(s) 627 can include one or more temperature sensor, humidity sensor, gas composition sensor, air quality sensor, light sensor, position sensors, one or more motion/orientation sensors, proximity sensor, and/or other types of sensors.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of identifying device location, comprising:
providing, by a mobile computing device, at least a first ultrasonic signal to a first beacon device and a second beacon device, wherein the first beacon device and the second beacon device are a portion of a plurality of beacon devices,
wherein the first beacon device is configured to determine a first location of the first beacon device by communicating with one or more other beacon devices of the plurality of beacon devices that comprises the first beacon device, and
wherein the second beacon device is configured to determine a second location of the second beacon device by communicating with one or more other beacon devices of the plurality of beacon devices that comprises the second beacon device;
receiving, by the mobile computing device, a first radio frequency signal from the first beacon device, wherein the first radio frequency signal comprises information associated with the first beacon device, wherein the information associated with the first beacon device comprises the first location of the first beacon device;
receiving, by the mobile computing device, a second radio frequency signal from the second beacon device, wherein the second radio frequency signal comprises information associated with the second beacon device, wherein the information associated with the second beacon device comprises the second location of the second beacon device;
determining, by the mobile computing device, a first time-of-flight associated with the first beacon device and a second time-of-flight associated with the second beacon device;
determining, by the mobile computing device, a third location of the mobile computing device based at least in part on the first time-of-flight, the second time-of-flight, the information associated with the first beacon device, and the information associated with the second beacon device, and providing information indicative of the location of the mobile device.

2. The computer-implemented method of claim 1, wherein the beacon-locating signals comprise ultra-wideband (UWB) signals.

3. The computer-implemented method of claim 1, wherein the first radio frequency signal and the second radio frequency signal respectively comprise Bluetooth low energy packets.

4. The computer-implemented method of claim 1, wherein the information associated with the first beacon device and the information associated with the second beacon device respectively comprise a condition of an environment around the respective beacon device.

5. The computer-implemented method of claim 1, wherein determining, by the mobile computing device, the third location of the mobile computing device comprises:
determining, by the mobile computing device, a first potential location and a second potential location of the mobile computing device based at least in part on the first time-of-flight, the second time-of-flight, the information associated with the first beacon device, and the information associated with the second beacon device; and
identifying, by the mobile computing device, the first potential location or the second potential location as the third location of the mobile computing device based at least in part on data describing a floorplan of an interior of a building within which the first and the second beacon devices are located.

6. The computer-implemented method of claim 1, wherein the first and the second beacon devices are within a common area and wherein determining, by the mobile computing device, the third location of the mobile computing device comprises:
    determining, by the mobile computing device, a first potential location and a second potential location of the mobile computing device based at least in part on the first time-of-flight, the second time-of-flight, the information associated with the first beacon device, and the information associated with the second beacon device; and
    identifying, by the mobile computing device, the first potential location or the second potential location as the third location of the mobile computing device by determining which of the first potential location or the second potential location is associated with the common area.

7. The computer implemented method of claim 1, wherein the information associated with the first beacon device comprises a first transmission time of the first radio frequency signal from the first beacon device and the information associated with the second beacon device comprises a second transmission time of the second radio frequency signal from the second beacon device, and
    wherein determining, by the mobile computing device, the first time-of-flight associated with the first beacon device and the second time-of-flight associated with the second beacon device, comprises:
        determining, by the mobile computing device, a first receipt time for the first radio frequency signal and a second receipt time for the second radio frequency signal, wherein the first receipt time indicates a first time at which the first radio frequency signal is received by the mobile computing device and the second receipt time indicates a second time at which the second radio frequency signal is received by the mobile computing device;
        determining, by the mobile computing device, the first time-of-flight associated with the first beacon device based at least in part on the first transmission time of the first radio frequency signal and the first receipt time of the first radio frequency signal; and
        determining, by the mobile computing device, the second time-of-flight associated with the second beacon device based at least in part on the second transmission time of the second radio frequency signal and the second receipt time of the first radio frequency signal.

8. The computer implemented method of claim 1, wherein the information associated with the first beacon device comprises a first receipt time that indicates when the first beacon device received the first ultrasonic signal, and the information associated with the second beacon device comprises a second receipt time that indicates when the second beacon device received the first ultrasonic signal, and
    wherein determining, by the mobile computing device, the first time-of-flight associated with the first beacon device and the second time-of-flight associated with the second beacon device, comprises:
        determining, by the mobile computing device, a transmission time of the first ultrasonic signal that indicates when the mobile computing device provided the first ultrasonic signal;
        determining, by the mobile computing device, the first time-of-flight associated with the first beacon device based at least in part on the transmission time of the first ultrasonic signal and the first receipt time; and
        determining, by the mobile computing device, the second time-of-flight associated with the second beacon device based at least in part on the transmission time of the first ultrasonic signal and the second receipt time.

9. The computer implemented method of claim 1, wherein the information associated with the first beacon device comprises a first time delay that indicates a time difference between when the first beacon device received the first ultrasonic signal and provided the first radio frequency signal, and the information associated with the second beacon device comprises a second time delay that indicates a time difference between when the second beacon device received the first ultrasonic signal and provided the second radio frequency signal, and
    wherein determining, by the mobile computing device, the first time-of-flight associated with the first beacon device and the second time-of-flight associated with the second beacon device, comprises:
        determining, by the mobile computing device, a transmission time of the first ultrasonic signal that indicates when the mobile computing device provided the first ultrasonic signal;
        determining, by the mobile computing device, a first receipt time for the first radio frequency signal and a second receipt time for the second radio frequency signal, wherein the first receipt time indicates a first time at which the first radio frequency signal is received by the mobile computing device and the second receipt time indicates a second time at which the second radio frequency signal is received by the mobile computing device;
        determining, by the mobile computing device, the first time-of-flight associated with the first beacon device based at least in part on the transmission time of the first ultrasonic signal, the first time delay, and the first receipt time; and
        determining, by the mobile computing device, the second time-of-flight associated with the second beacon device based at least in part on the transmission time of the first ultrasonic signal, the second time delay, and the second receipt time.

10. A mobile computing device comprising:
one or more processors; and
one or more memory devices storing computer-readable instructions that when executed by the one or more processors cause the one or more processors to perform operations, the operations comprising:
    providing a plurality of first signals to two or more beacon devices, wherein the plurality of first signals comprise ultrasonic signals, wherein the two or more beacon devices are included in a plurality of beacon devices, and wherein each of the two or more beacon devices is configured to communicate with the plurality of beacon devices that includes the two or more beacon devices to determine its respective location, and
    receiving a plurality of second signals from the two or more beacon devices, wherein the plurality of second signals comprise radio frequency signals, and wherein each of the plurality of second signals comprises data indicative of the location of one of the two or more beacon devices;
    determining two or more times-of-flight respectively associated with the two or more beacon devices;
    determining a location of the mobile computing device based at least in part on the two or more times-offlight respectively associated with the two or more beacon devices and the locations of each of the two or more beacon devices, and providing information indicative of the location of the mobile device.

11. The mobile computing device of claim 10, wherein each of the two or more beacon devices is configured to communicate with the plurality of beacon devices to determine its respective location by sending and receiving a plurality of beacon-locating signals.

12. The mobile computing device of claim 11, wherein the beacon-locating signals are ultra-wideband (UWB) signals.

13. The mobile computing device of claim 10, wherein the second signals comprise Bluetooth low energy packets.

14. The mobile computing device of claim 10, wherein each of the two or more beacon devices are associated with a common area and wherein determining the location of the mobile computing device comprises:
  determining a first potential location and a second potential location of the mobile computing device based at least in part on the two or more times-of-flight respectively associated with the two or more beacon devices and the locations of each of the two or more beacon devices; and
  identifying, by the mobile computing device, the first potential location or the second potential location as the location of the mobile computing device by determining which of the first potential location or the second potential location is associated with the common area.

15. A beacon device, comprising:
  an ultrasonic receiver;
  a radio frequency transmitter;
  one or more processors; and
  one or more memory devices storing computer-readable instructions that when executed by the one or more processors cause the beacon device to perform operations, the operations comprising:
    sending one or more first beacon-locating signals to one or more other beacon devices of a plurality of beacon devices that includes the beacon device;
    receiving one or more second beacon-locating signals from the one or more other beacon devices of the plurality of beacon devices that includes the beacon device;
    determining a location of the beacon device based, at least in part, on one or more of the first beacon-locating signals or the second beacon-locating signals;
    receiving, by the ultrasonic receiver, one or more ultrasonic signals from a mobile computing device; and
    providing, by the radio frequency transmitter, one or more radio frequency signals to the mobile computing device in response to the one or more ultrasonic signals, wherein the one or more radio frequency signals comprise data indicative of the location of the beacon device.

16. The beacon device of claim 15, wherein the first beacon-locating signals and the second beacon-locating signals are ultra-wideband (UWB) signals.

17. The beacon device of claim 15, wherein the radio frequency signals comprise Bluetooth low energy packets.

18. The beacon device of claim 15, wherein the beacon device comprises an anchor beacon device that has a reference location that has been confirmed relative to an existing coordinate system, the anchor beacon device configured to provide the one or more first beacon-locating signals that comprise the reference location of the anchor beacon.

19. The beacon device of claim 15, wherein the radio frequency signals further comprise data describing a floorplan of an interior of a building with which the beacon device is located.

20. The beacon device of claim 19, wherein the data describing the floorplan comprises data indicative of a particular area of the building in which the beacon device is located.

* * * * *